UNITED STATES PATENT OFFICE.

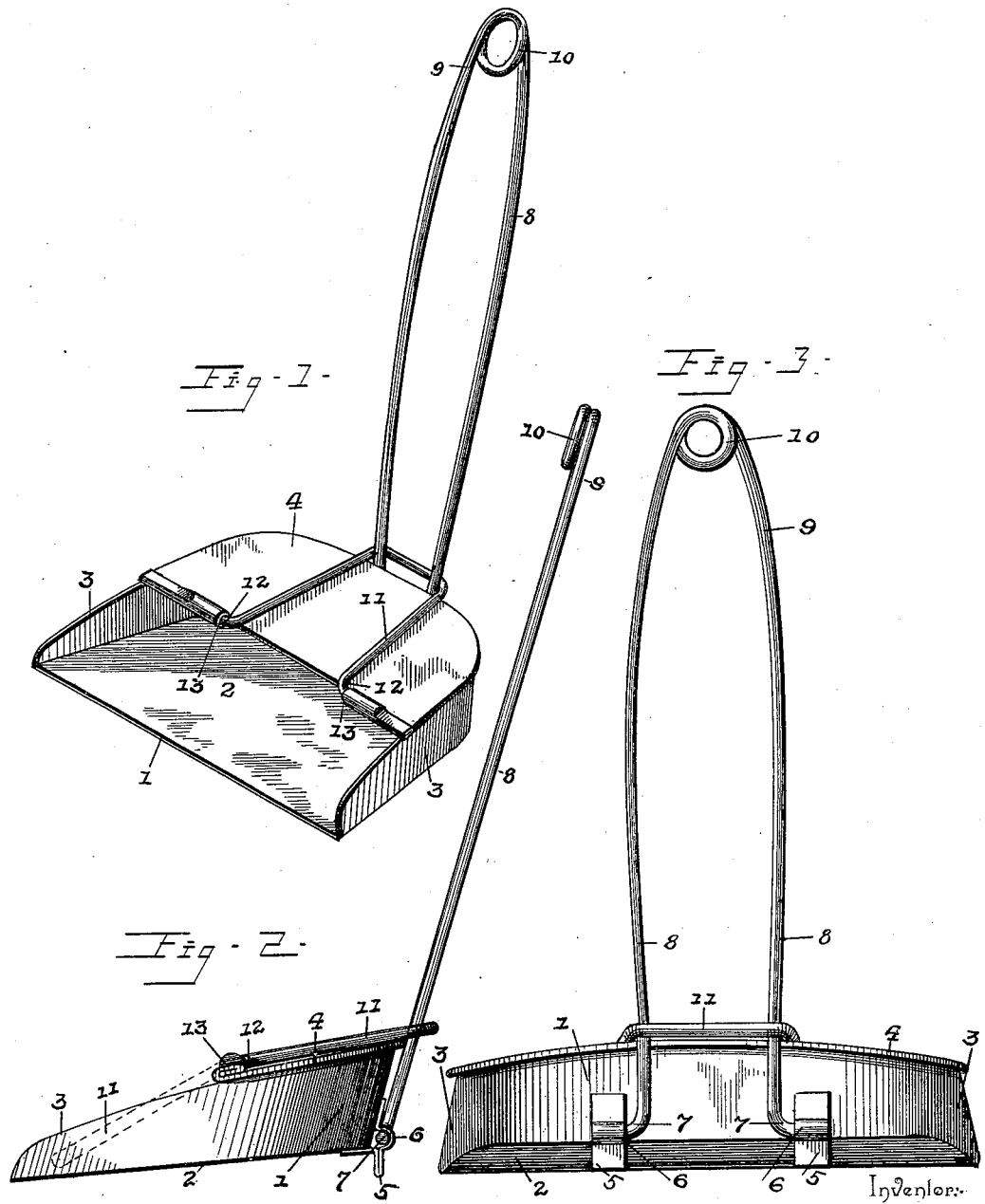

MARY L. STANDISH, OF COOLIDGE, KANSAS.

DUST-PAN.

SPECIFICATION forming part of Letters Patent No. 595,823, dated December 21, 1897.

Application filed September 13, 1897. Serial No. 651,495. (No model.)

*To all whom it may concern:*

Be it known that I, MARY L. STANDISH, a citizen of the United States, residing at Coolidge, in the county of Hamilton and State of Kansas, have invented a new and useful Dust-Pan, of which the following is a specification.

This invention relates to improvements in dust-pans.

The object of the present invention is to improve the construction of dust-pans and to provide a detachable handle adapted for enabling a dust-pan to be held and manipulated without necessitating stooping and capable of being compactly folded for transportation or storage.

The invention consists in the construction and novel combination and arrangement of parts, as hereinafter fully described, illustrated in the accompanying drawings, and pointed out in the claims hereto appended.

In the drawings, Figure 1 is a perspective view of a dust-pan constructed in accordance with this invention. Fig. 2 is a side elevation. Fig. 3 is a rear elevation.

Like numerals of reference designate corresponding parts in the several figures of the drawings.

1 designates a dust-pan comprising a bottom 2, sides 3, and a hood 4, all constructed and arranged similar to an ordinary dust-pan. The dust-pan is provided at opposite sides of the back with depending legs 5, which support the bottom of the pan above the floor at the proper inclination and which are preferably constructed of a strip of metal doubled to form the leg portion and having one terminal secured to the bottom of the pan and its other terminal bowed outward to provide an eye 6 and secured to the back of the pan, the eye being located in substantially the same plane as the bottom of the pan. The eyes 6, which may be otherwise constructed, are adapted to be engaged by outwardly-bent terminals 7 of sides 8 of a handle 9, which is substantially U-shaped, being constructed of a single piece of wire or other suitable material bent between its ends to form a spring-coil 10 at the upper end of the handle. The spring-coil operates to force the sides 8 of the handle outward and hold the projections or lugs 7 in engagement with the eyes 6. By compressing the sides of the handle the projections or lugs at the lower ends thereof are disengaged from the eyes and the handle is detached from the pan.

The handle is maintained in an upright position rigid with the pan by a hinged loop 11, arranged at the upper face of the hood or top of the pan and constructed of wire or other suitable material. The ends of the sides of the loop 11 are bent outward similar to the terminals of the handle to provide projections or lugs 12, which are detachably arranged in eyes 13. The eyes 13 are arranged at the front edge of the hood or top of the pan and are formed by rolling the front edges of the said hood or top in the manner shown. The loop 11 projects rearward beyond the pan a sufficient distance to provide an opening for the handle, as clearly illustrated in Fig. 1 of the accompanying drawings, and when the handle is in place it lies flat upon the hood or top of the pan.

The handle may be readily disengaged from the pan, and the loop 11 may, by compressing its sides, be sprung out of engagement with the eyes 13, or it may, as illustrated in dotted lines in Fig. 2 of the accompanying drawings, be swung forward and downward. By this construction the pan may be compactly arranged for shipping or storing.

The pan is placed upon the floor in operation and the dust swept into it, the handle enabling the pan to be manipulated and moved without requiring the person using it to stoop over from an upright position.

The invention has the following advantages: The handle will enable the dust-pan to be readily manipulated while the person using it is in an upright position, and it prevents stooping. It is detachably secured to the back of the pan and may be readily removed when the same is not in use, and the hinged loop may be swung forward out of the way or entirely disconnected from the pan by springing its sides out of engagement with the eyes of the top or hood.

Changes in the form, proportion, and minor details of construction may be resorted to without departing from the spirit or sacrificing any of the advantages of this invention.

What I claim is—

1. The combination of a pan provided at its back with eyes, a loop extending from the back of the pan and located above the eyes, and a detachable handle extending through the loop and provided with opposite compressible lugs or projections engaging the eyes, substantially as described.

2. The combination of a pan provided at its back with eyes, a loop extending from the back of the pan and located above the eyes, and a substantially U-shaped handle provided at its top with a spring-coil, and having projections or lugs at the lower ends of its sides for engaging the eyes, substantially as described.

3. The combination of a pan, a loop hinged to the top of the pan, extending rearward beyond the back of the same and adapted to swing forward, and a detachable handle extending through the loop and engaging the pan below the same, substantially as described.

4. The combination of a pan provided at its back with eyes and having eyes at opposite sides of its top or hood at the front thereof, a substantially U-shaped loop having the terminals of its sides bent outward and detachably engaged with the eyes at the top of the pan, and a substantially U-shaped handle extending through the loop and having the terminals of its sides bent outward and engaging the eyes at the back of the pan, substantially as described.

In testimony that I claim the foregoing as my own I have hereto affixed my signature in the presence of two witnesses.

MARY L. STANDISH.

Witnesses:
JOHN H. LYON,
MILES STANDISH.